US006874217B2

(12) United States Patent
Ploeger et al.

(10) Patent No.: US 6,874,217 B2
(45) Date of Patent: Apr. 5, 2005

(54) DISC BRAKE PAD SPREADING TOOL

(75) Inventors: Randall J. Ploeger, Clarinda, IA (US); George P. Juliano, deceased, late of Pittsburgh, PA (US); by Martha Juliano, legal representative, Pittsburgh, PA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 10/339,091

(22) Filed: Jan. 9, 2003

(65) Prior Publication Data
US 2004/0134052 A1 Jul. 15, 2004

(51) Int. Cl.⁷ .................................................. B23P 19/04
(52) U.S. Cl. ........................................................ 29/239
(58) Field of Search ....................... 29/239, 266; 269/6, 269/108

(56) References Cited

U.S. PATENT DOCUMENTS 6,523,238 B1 * 2/2003 Priddy .......................... 29/239
6,585,243 B1 * 7/2003 Li ................................... 269/6

FOREIGN PATENT DOCUMENTS

GB          2 194 989 A      3/1988

OTHER PUBLICATIONS

*Lisle* catalog, No. 24400 Disc Brake Pad Spreader, p. 4.
*California Tool Co.* catalog, K–D Disc Brake Pad Spreader, No. 2145, Section 63, p. 760.
*California Tool Co.* catalog, OTC Disc Brake Pad Spreader, No. 7034, Section 63, p. 760.
*California Tool Co.* catalog, K–D Disc Brake Pad Spreader, No. 3376, Section 63, p. 760.
*California Tool Co.* catalog, ATD Tools, Disc Brake Pad Spreader, No. 5050, Section 63, p. 761.
*California Tool Co.* catalog, Cal–Van Disc Brake Pad Spreader, No. 702, Section 63, p. 761.
*California Tool Co.* catalog, Rimac, Disc Brake Pad Spreader, No. 0096, Section 63, p. 761.
Invention Disclosure Agreement by George P. Juliano, "Brake Piston Compressor Kit".
Invention Disclosure Agreement by Marshall A. Green, "Disc Brake Pad Spreader".
Invention Disclosure Agreement by Bernard H. Miller, "Disc Brake Pad Spreader".
Invention Disclosure Agreement by Juan Lopez, "Disc Brake Pad Spreader".
Invention Disclosure Agreement by Joe Barallon, "Tool For Seating Piston on Disc Brake Caliper".
Invention Disclosure Agreement by Dal Sirany, "Brake Caliper Piston Retraction Tool".
Invention Disclosure Agreement by George Gonzalez, "Disc Brake Pad Spreader".

* cited by examiner

*Primary Examiner*—Robert C. Watson
(74) *Attorney, Agent, or Firm*—Banner & Witcoff, Ltd.

(57) ABSTRACT

A tool for spreading brake pads and for compressing the piston of a disc brake assembly of the type including a disc brake caliper housing for the pads and piston. The tool includes manually operated handles which drive a rod attached to a plunger that engages one of the disc brake pads. The housing for the tool includes a backing plate which is engaged against the caliper pad. The backing plate and plunger are driven in a manner which causes them to become spaced from one another. A mechanical advantage is achieved by utilization of handles with a lever arm extension associated with a pivotal handle.

2 Claims, 2 Drawing Sheets

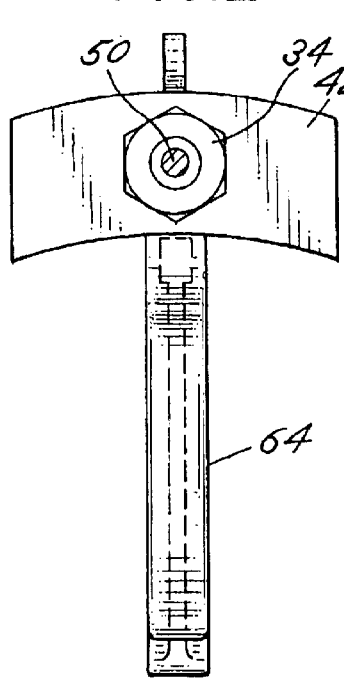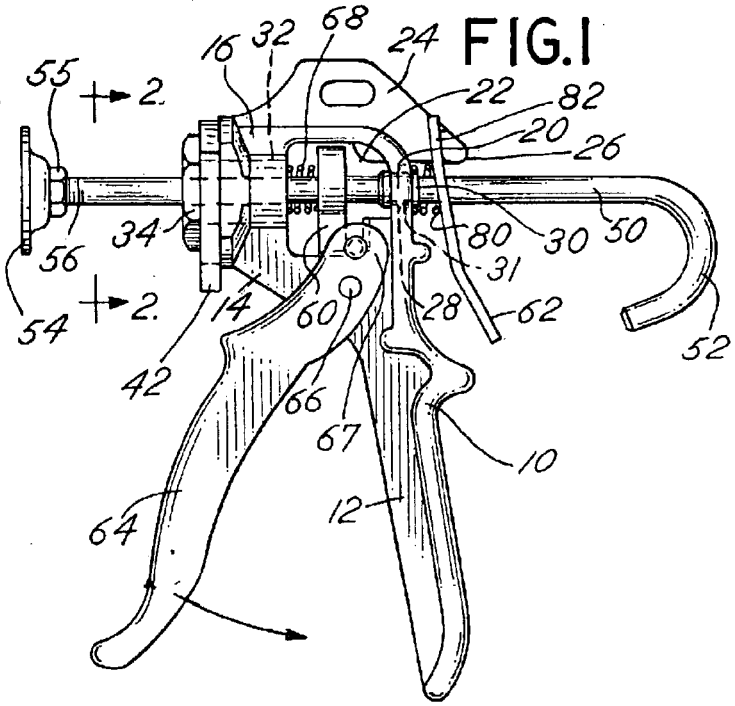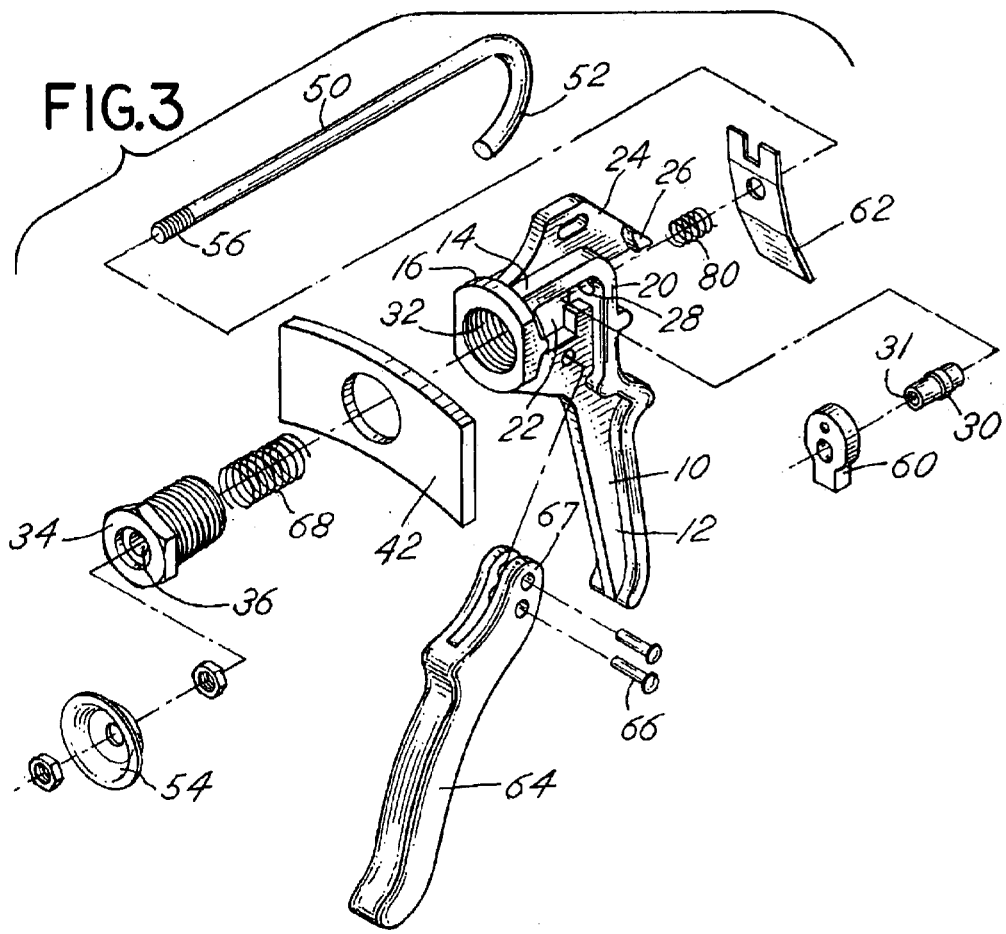

2

DISC BRAKE PAD SPREADING TOOL

BACKGROUND OF THE INVENTION

In a principal aspect the present invention relates to a tool for spreading the disc pads of a vehicle disc brake assembly so that the pads may be replaced. The invention thus comprises a manually actuated disc pad spreading tool.

In the repair of vehicles and, for example, with respect to the repair of vehicle braking systems, many special tools are desirable. Disc brakes typically include a caliper housing which is mounted adjacent a wheel. The housing includes opposed disc pads for clamping a disc associated with a wheel of the vehicle. From time to time, it is necessary to replace the pads due to the fact that they wear from frictional contact with the rotating disc. In such circumstances, the caliper housing is typically removed from the wheel assembly of the vehicle, and the disc pads are caused to be spread. The spread pads may then be easily removed and replaced. The caliper housing may then be replaced in the wheel assembly positioned for engagement with the brake disc.

Heretofore, applicants' assignee has made available in the marketplace a disc brake pad spreader tool, Lisle Product Model No. 24400. The Model No. 24400 disc brake pad spreader comprises a plate having a threaded rod through the center of the plate with a plunger mounted on the end of the rod. The plunger and plate are positioned between the opposed pads of a disc brake caliper and are separable by rotating the threaded bolt or rod which connects the plate and plunger.

The described mechanism works quite well and has been widely accepted by automechanics responsible for the repair of disc brakes. A difficulty associated with such a construction, however, is the manual effort often required to effect spreading the disc brake pads. That is, turning the threaded rod may be difficult because the brake piston which drives the pads together may be difficult to reposition or move, and because it impinges against one of the pads, pad separation will be difficult. Thus, there has developed a need for an improved disc brake pad spreading tool which can effectively spread the pads mounted in the caliper housing and which can also compress the piston associated with the caliper housing.

SUMMARY OF THE INVENTION

Briefly, the present invention is a tool for spreading the brake pads associated with a disc brake caliper. The tool includes a plunger mounted on the end of a slidable rod which, in turn, is mounted in a hand actuated rod advancement mechanism. The rod advancement mechanism further includes a backing plate positioned in opposed relationship to the plunger. The backing plate may be fitted against a first side of a caliper brake pad assembly for a disc brake, and the plunger may then be driven into engagement with the opposite side thereby separating the disc pads and/or disc pad mounts and also simultaneously compressing the brake piston into the cylinder for the caliper. The mechanism for advancing the rod upon which the plunger is mounted comprises a fixed handle and a pivotal handle. The pivotal handle engages a feed dog that drives the rod incrementally forward with each reciprocal movement of the pivotal handle. A rod brake or pawl comprised of a second pivotal plate is provided for engaging the drive rod and precluding backwards movement of the rod. In other words, as the rod is moved forward in incremental steps, the rod braking plate maintains the rod in a desired or fixed advanced position. With the combination of the invention, an improved mechanical advantage is achieved for driving the pads of the disc brake apart and for driving the piston associated with the disc brake caliper into the housing of the caliper. In this manner, new pads may be placed upon pad mounts in the caliper and properly spaced so as to permit the caliper to be reassembled with the disc brake assembly.

Thus, it is an object of the invention to provide a disc brake pad and piston compressing device which provides for improved mechanical advantage and ease of use.

It is a further object of the invention to provide a disc brake pad spreading device which is easy to use, economical, rugged, and easy to fit and position during repair of a disc brake assembly.

Yet another object of the invention is to provide a tool for spreading disc brake pads and for compressing a piston of a disc brake assembly wherein the tool is comprised of a pair of handles, one of which is reciprocal with respect to the other to effect separation of a plunger from a backing plate wherein the plunger and the backing plate are respectively engaged with opposed, generally parallel spaced disc brake pads or disc brake pad mounting plates.

Yet a further object of the invention is to provide an improved tool for spreading disc brake pads during repair of a disc brake assembly.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a side elevation of the tool of the invention;

FIG. 2 is an end view of the tool of FIG. 1 taken along the line 2—2 of FIG. 1;

FIG. 3 is an exploded isometric view of the tool of FIG. 1;

DESCRIPTION OF THE PREFERRED EMBODIMENT

Figure 4:
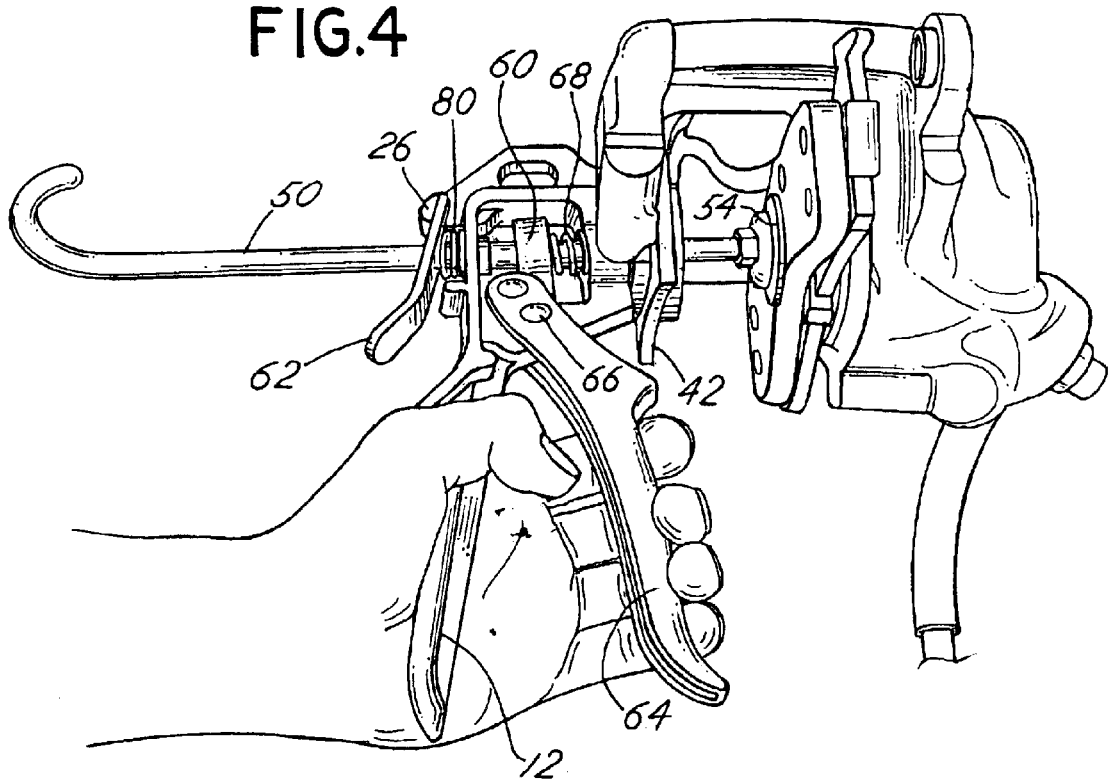
FIG. 4 is an isometric view illustrating the manner of use of the tool of FIG. 1.

Referring to the figures, the tool of the invention comprises a body or frame member 10. The frame member 10 includes a depending fixed handle 12 with an upper frame element 14 comprising a first or forward frame section 16 and a second or rear frame section 20. The frame sections 16 and 20 are generally parallel to one another and spaced to define a window 22. A reinforcing rib 24 with a mounting projection 26 is provided on the top of the frame element 14. The rear frame section 20 includes a throughbore 28 into which a cylindrical hollow fitting 30 with throughbore 31 is inserted. The front frame section 16 also includes a throughbore 32 into which a flanged nut 34 having an internal throughbore 36 with counterbore 38 on the inside end and counterbore 40 on the outside end being provided. The flanged nut 34 is threaded into the front frame section 16 and holds a backing plate 42 onto the front frame section 16. The backing plate is a planar plate having a generally arcuate shape in plan view as depicted in FIG. 2.

The flanged nut 34 and, more particularly the throughbore 36 as well as the throughbore 31 of the fitting 30, receive an elongate rod 50 having a curved outer end 52 and a straight section projecting through the bores 31, 36 of the fitting 30 and nut 34. A plunger 54 is attached to the outer end 56 of the rod 50. The rod 50 is slidable through the frame element 14 with the sliding movement controlled by means of a biased feed dog 60 and a biased locking bar, plate or pawl 62 in combination with a pivotal handle 64 mounted on the frame member 10 by means of a pivot pin 66. The pivotal handle 64 includes a lever arm extension 67 which, when pivoted on pin 66, engages with a lower side or end 61 of the dog 60 and advances the dog 60 as well as the rod 50 against the biasing force of a coil spring 68 mounted on the rod 50 intermediate the dog 60 and a land 70 in the counterbore 38. Counterbore 38 functions to maintain the spring 68 appropriately guided in alignment for biasing of the dog 60.

The tool further includes a locking bar 62 biased by a spring member 80 about a pivot axis 82 on the reinforcing rib 24. The locking bar 62 includes a throughpassage into which the rod 50 fits and when the biasing spring 80 biases the locking bar 62 in the manner depicted in FIG. 1 the edges of the throughpassage engage the rod 50 precluding the rod 50 from moving in the direction of the arrow or to the right as depicted in FIG. 1. The rod 50 may, however, be manually moved in the opposite direction or to the left as depicted in FIG. 1. The dog lever extension arm 67 of handle 64provides a mechanical advantage when advancing the rod 50 to the left. In other words, the dog 60 includes a throughpassage which is oversized relative to the diameter of the rod 50. Driving the dog 60 forward by means of actuation of the pivotal handle 64 causes the dog 60 to become canted slightly. It will thus engage the rod 50 and drive the rod 50 to the left as illustrated in FIG. 1. The dog 60 will return to its uncanted, initial position upon release of the handle 64 thereby enabling the spring 68 to transport dog 60 to the right and position the dog 60 for an additional incremental movement of the rod 50. In this manner, the plunger or disc 54 on the end of the rod 50 can be driven so as to be further spaced from the backing plate 42.

By positioning the backing plate 42 against one side of a pad mount for the caliper of a disc brake assembly, such as depicted in FIG. 4, and the plunger 54 against the opposite pad mount and/or pad, one may effect spreading of the pads. Once the pads are spread, they may be easily removed from the caliper housing. The spreading operation also causes a brake piston, which drives the pads toward each other, to be retracted into the cylinder associated with the caliper. The pads may thus be removed, replaced and/or then maintain the spread distance one from the other until the caliper is replaced within the brake assembly. By pre-spreading the pads in the manner described, one can be assured that the caliper can be positioned so that the pads will fit over and on opposite sides of the disc of the disc brake assembly.

The described construction provides a mechanical benefit in that the handles 64 and 12, when used in combination with the other elements of the apparatus, enable the operator to provide a significant mechanical advantage due to the long extension of the typical handle 64 relative to the extension lever arm 67. The utilization of a locking dog 60 in combination with a locking plate 62 and associated biasing springs arranged in the manner depicted enables movement of the rod 50 to spread the pad spreading elements and maintain that spread. Release of the element from a spread position is effected by pressing on the brake lever or locking plate 62 and moving it clockwise in the direction shown by the arrow in FIG. 1 against the force of the biasing spring 80. The rod 50 is then free to move.

Figure 5:
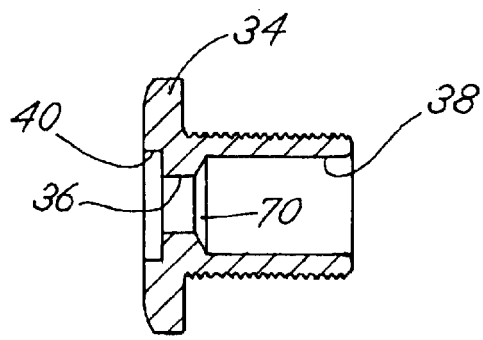
FIG. 5 is a cross sectional view of the rod mounting arrangement for mounting the drive rod of the tool in the support frame and handle assembly of the tool.

Importantly, as shown in FIG. 5, the flanged nut 34 includes counterbores 38 and 40 at the opposite ends thereof. The counterbores are greater in diametrical dimension than the bore 36 for the rod 50. This enables the inside bore 38 to act as a guide for a dog biasing spring 68. The outside counterbore 40 enables the plunger to be positioned more closely to the backing plate 42 inasmuch as a mounting nut 55 for the plunger 54 may fit within the recess defined by the counterbore 40. Thus, the pad engaging elements associated with the described tool will have a more universal application inasmuch as they can be used with calipers having a wide variety of caliper sizes.

In operation, the rod 50 is moved to the right as depicted in FIG. 1 so that the plunger 54 is engaged closely to the backing plate 42. The backing plate 42 is then placed against one side of the backing plate pad mounts of a caliper. The opposite plunger is then engaged against the pad or pad mounts of the caliper and driven into engagement therewith by operation of the handle 64 in combination with the handle 12. The locking mechanism described maintains the rod 50 in the desired position. Once the pads and/or pad mounts have spread, the tool may be removed. The pressure on the piston in the caliper housing is usually inadequate or is released in order that the pad mounting plates will remain in a spread condition. The pads may then be easily replaced and the caliper may be reassembled with the disc brake assembly.

Variations of the construction may be adopted. For example, the particular arrangement of the handle may be reversed with the back handle 12, which is a fixed handle, being made to be pivotal and the forward handle 64 being made to be fixed. The particular arrangement of the locking bar 62 may also be altered. Thus, while there has been set forth a preferred embodiment of the invention, it is to be understood that the invention is limited only by the following claims and equivalents thereof.

What is claimed is:

1. A tool for spreading brake pads and for compressing a piston of a disc brake assembly, said assembly including disc brake caliper housing, said piston mounted in a cylinder in said caliper housing and said pads mounted on opposed pad mounts in opposed, generally parallel, spaced relation in said housing and positioned for engagement with a disc member therebetween, said tool comprising, in combination:

a frame having a depending fixed handle and a window in the frame, said window including first and second spaced side frame sections, said first and second side frame sections generally parallel to the fixed handle and spaced one from the other, each said frame section including a through passage;

a rod slidably extending through the through passages of said frame sections, said rod including an outer end with a pad engaging member attached thereto;

a backing plate affixed to the frame in opposed relation to the pad engaging member, said backing plate including a throughbore for the slidable rod, said backing plate comprising an elongate planar plate member with said throughbore positioned substantially at the midpoint between the elongate ends;

a pivotal handle member affixed to the frame said pivotal handle member including a lever arm extension projecting into the window;

a biased feed dog on the rod intermediate the lever arm extension of the pivotal handle and the backing plate, whereby manual pivoting of the pivotal handle in one sense will advance the rod in the through passages and thereby increase spacing of the pad engaging member from the backing plate, said feed dog comprising a plate with a through passage for the rod and including:

a backing pate fastener having a throughpassage for the rod and a counterbore, said backing plate fastener fitted through the backing plate throughbore; and a coil spring on the rod intermediate the feed dog and the backing plate fastener spring retaining counterbore; and a rod brake attached to the frame and pivotal between a first braking position locking the rod in a non-slidable position and a rod release position whereby the backing plate and pad engaging member may be positioned intermediate the pad mounts of a caliper housing and incrementally separate said pad mounts by actuation of the feed dog by means of the pivotal handle to thereby increase spacing of pad mounts and to simultaneously compress the piston.

2. The tool of claim 1 wherein the feed dog and rod brake each comprise a plate member with a through passage for the slidable rod, the plate members being biased in opposite directions on the rod and each through passage having a greater cross section than the cross section of the rod whereby the rod may be incrementally advanced by the feed dog and held in a non-retractable position by the brake plate member.

* * * * *